G. N. HIGGS AND A. J. JOB.
TEST SQUARE.
APPLICATION FILED MAR. 26, 1919.
1,321,038.
Patented Nov. 4, 1919.
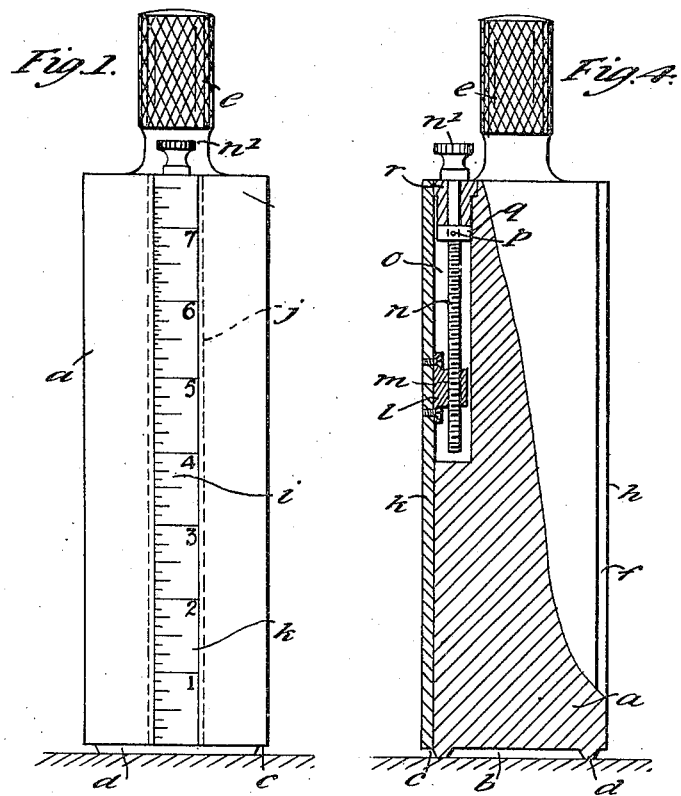
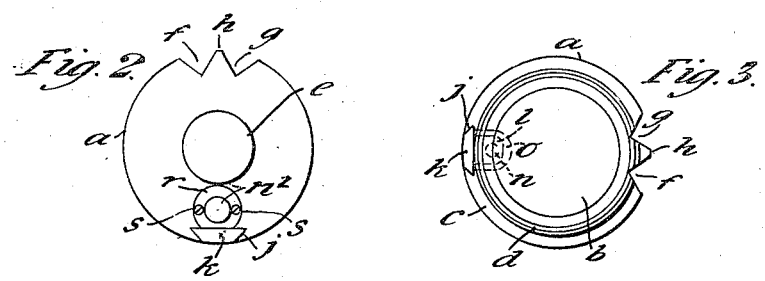
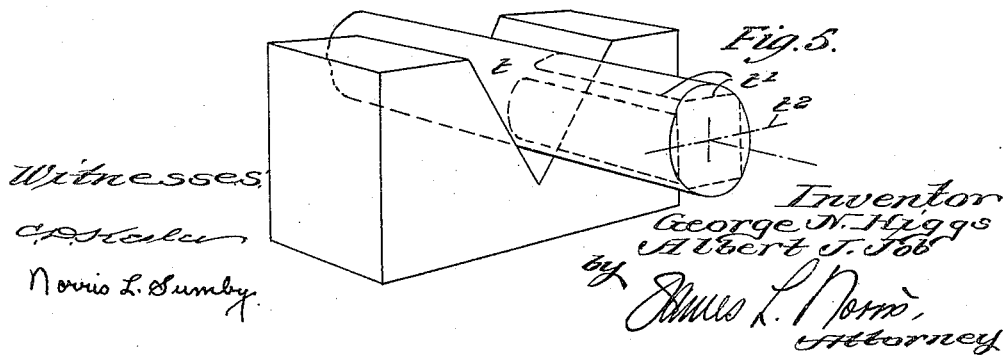
Witnesses
Inventor
George N. Higgs
Albert J. Job
by
Attorney

UNITED STATES PATENT OFFICE.

GEORGE NORMAN HIGGS AND ALBERT JOHN JOB, OF LONDON, ENGLAND.

TEST-SQUARE.

1,321,038.    Specification of Letters Patent.    Patented Nov. 4, 1919.

Application filed March 26, 1919. Serial No. 285,306.

*To all whom it may concern:*

Be it known that we, GEORGE NORMAN HIGGS and ALBERT JOHN JOB, both subjects of the King of Great Britain, residing in London, England, have jointly invented certain new and useful Improvements in or Relating to Test-Squares, of which the following is a specification.

Our invention relates to test squares of the kind comprising a cylindrical pillar which is used in conjunction with a level table or surface plate, as used in engineering workshops for squaring up articles, the longitudinal surface of the pillar being turned so as to be exactly parallel with its axis and its ends being formed with projecting parts or ribs having surfaces exactly at right angles to the said axis. It has for its object to produce an improved square that is provided on its side with a pair of longitudinally-disposed grooves spaced at an appropriate distance apart to form a testing edge.

The improved square is such that it needs no handling when made use of by an operator so that the two hands of the latter are left free for other purposes. It is preferably fitted with a scale rule or gage that is adjustable relatively to the square in a direction longitudinal thereof so that when the square and rule are employed for the purpose of marking off or graduating articles considerable calculations and time may be saved by adjusting the scale so that a graduation mark or division thereon is opposite or in alinement with the center of the article marked off.

The invention will be described with reference to the accompanying drawings in which Figure 1 is an elevation of the improved test square, which is shown fitted with an adjustable scale rule; Figs. 2 and 3 are plans of, respectively, the top and bottom and Fig. 4 is a sectional elevation of the square. Fig. 5 is a perspective view of an end of a spindle placed on a V block for the purpose of being marked off with the help of the adjustable scale rule.

The cylinder $a$ constituting the square is made of steel or other appropriate heavy metal and is carefully ground within fine limits. The base of the cylinder is recessed at $b$ and cut away at $c$ so as to form a depending rib or ring $d$ which since it stands out in relief can be easily trued and tested. The side of the cylinder $a$ and the face of the ring $d$ would be ground between centers at one operation in a manner to insure an absolutely true right angle between planes tangential to the side of the cylinder $a$ and the face of the ring $d$.

For handling purposes the cylinder $a$ may with advantage be provided with a handle or knob $e$.

As shown in Figs. 2 and 3, a pair of grooves $f$, $g$ are milled or formed along the side of the cylinder $a$, parallel with the axis thereof. The two grooves are arranged at a small distance apart so as to leave a small portion $h$ of cylindrical surface between them, which portion stands out or free from the adjacent portions of the cylindrical surface and thus serves as a convenient testing edge and facilitates the operation of testing for squareness any article placed against it.

With the cylindrical body $a$ there is preferably combined a scale rule or graduated gage $i$ for graduating or marking off purposes. To this end the cylinder $a$ at any convenient part of its side is provided with a longitudinal undercut slot $j$ for the reception of a correspondingly shaped graduated gage piece $k$ having a sliding fit therein. For the purpose of adjusting the gage lengthwise of the cylinder we provide a bracket $l$ which has a threaded hole $m$ through which works a screwed spindle $n$. The bracket or nut $l$ is disposed in a recess $o$ that adjoins the slot $j$ and extends, parallel with the axis, from the top of the cylinder for a suitable distance toward the bottom thereof. The spindle $n$ is retained in position by means of a pin $p$ and collar $q$ arranged to bear against the depending end of a cap piece $r$ which may be secured by means of screws $s$ to the cylinder top. The spindle $n$ passes through the cap piece $r$, which also serves as a guide therefor. The outer end of the handle is fitted with a knob $n'$ or other appropriate device wherewith it may be rotated for adjusting the gage in directions longitudinally of the cylinder.

When in use the cylinder $a$ is placed in a vertical position with base ring $d$ resting on a table or surface plate. An article to be tested for squareness would be placed with one of its sides containing the angle to be tested on the table and its other side against the testing edge $h$.

The advantage accruing from the scale rule $k$ being mounted on the square so as to be adjustable in position lengthwise is best explained by the aid of an illustration, Fig. 5. Supposing for instance it be required to secure the end of a cylindrical spindle $t$, the spindle is placed on two or more suitable supports, such as V blocks (one of which is shown in Fig. 3) in order that the sides $t'$ of the square to which the said end is to be reduced may be marked off. The horizontal center line $t^2$ of the spindle is first determined in customary manner by means of a scriber tool, then on the test square and scale $k$ being brought near, the scale $k$ is adjusted, by turning the knob $n'$ and spindle $n$, to bring one of the primary division marks, such as 1, 2, 3, .... 7, opposite or into register with the line $t^2$. The positions of the required markings on the spindle end, at desired distances above or below the center line, can be then determined by measuring such distances directly from the said registered primary division and along the scale; whereas, if no adjustment of the scale were possible, and the center line $t^2$ were out of true or register with one or other of the division lines on the scale, some difficulty would be experienced with attendant liability to error, in calculating the correct distances above and below the center line.

Having thus described the nature of the said invention and the best means we know of carrying the same into practical effect, we claim:—

1. A portable test square, for use in co-operation with a level base or surface plate, comprising an upright cylindrical pillar the lower end or base thereof being formed with a downwardly projecting rib, the end face of the rib lying in a plane at right angles to the axis of the cylinder and adapted to bear truly upon the said base plate, the cylindrical surface of the cylinder being provided with a pair of longitudinally disposed grooves spaced apart at such a distance as to leave between them a longitudinal strip of the cylindrical surface to serve as a testing edge, substantially as described.

2. A portable test square, for use in co-operation with a level base or surface plate, comprising in combination an upright cylindrical pillar the lower end or base thereof being formed with a downwardly projecting rib the end face of the rib lying in a plane at right angles to the axis of the cylinder and adapted to bear truly upon the said base plate, the cylindrical surface of the cylinder being provided with an undercut longitudinal slot and with a pair of longitudinally disposed grooves, said grooves being spaced apart at such a distance as to leave between them a longitudinal strip of the cylindrical surface to serve as a testing edge, a graduated gage piece slidably mounted in said slot, and means for adjusting the position of the gage piece in the slot, substantially as described.

In testimony whereof we have signed our names to this specification.

GEORGE NORMAN HIGGS.
ALBERT JOHN JOB.

Copies of this patent may be obtained for five cents each, by addressing the "Commissioner of Patents, Washington, D. C."